United States Patent [19]

Dusel et al.

[11] Patent Number: 4,493,233
[45] Date of Patent: Jan. 15, 1985

[54] APPARATUS FOR CUTTING AND CONVEYING SEGMENTS OF WIRE OR CABLE

[75] Inventors: Robert O. Dusel, Brookfield; James J. Berres; Harold J. Keene, both of Milwaukee, all of Wis.

[73] Assignee: Artos Engineering Company, New Berlin, Wis.

[21] Appl. No.: 507,231

[22] Filed: Jun. 22, 1983

[51] Int. Cl.³ .............................................. B26D 7/06
[52] U.S. Cl. ........................................ 83/71; 83/151; 83/155; 83/373; 198/627; 81/9.51
[58] Field of Search ................. 198/627, 628; 81/9.51; 83/151, 155, 155.1, 71, 373

[56] References Cited

U.S. PATENT DOCUMENTS 4,175,316 11/1979 Gudmestad ...................... 81/9.51 X Primary Examiner—James M. Meister
Attorney, Agent, or Firm—James E. Nilles; Thomas F. Kirby

[57] ABSTRACT

Apparatus is provided for repeatedly cutting segments from a strand of wire or cable and for conveying them to work stations so that either or both ends can be processed to provide a partly or fully finished wire lead or cord. The apparatus comprises: a feed mechanism for moving the free end of the strand in incremental steps along a first path; inboard and outboard laterally spaced apart conveyor units for moving the segments in steps along a second path transverse to the first path, each unit comprising a pair of endless flexible belts having separable soft-faced confronting flights; a separator device for each conveyor unit to periodically separate and reclose the confronting flights; a set of periodically closable and reopenable wire guide members on each side of each conveyor unit and operable by the associated separator device; an independently openable elongated wire guide located between the conveyor units in alignment with the sets of wire guide members; a cutter located between the feed mechanism and the set of wire guide members on the outside of the inboard conveyor unit; and drive mechanisms and a programmable controller for operating the feed mechanism, the conveyor units and their associated separator devices and wire guides, and the cutter in synchronism.

19 Claims, 22 Drawing Figures

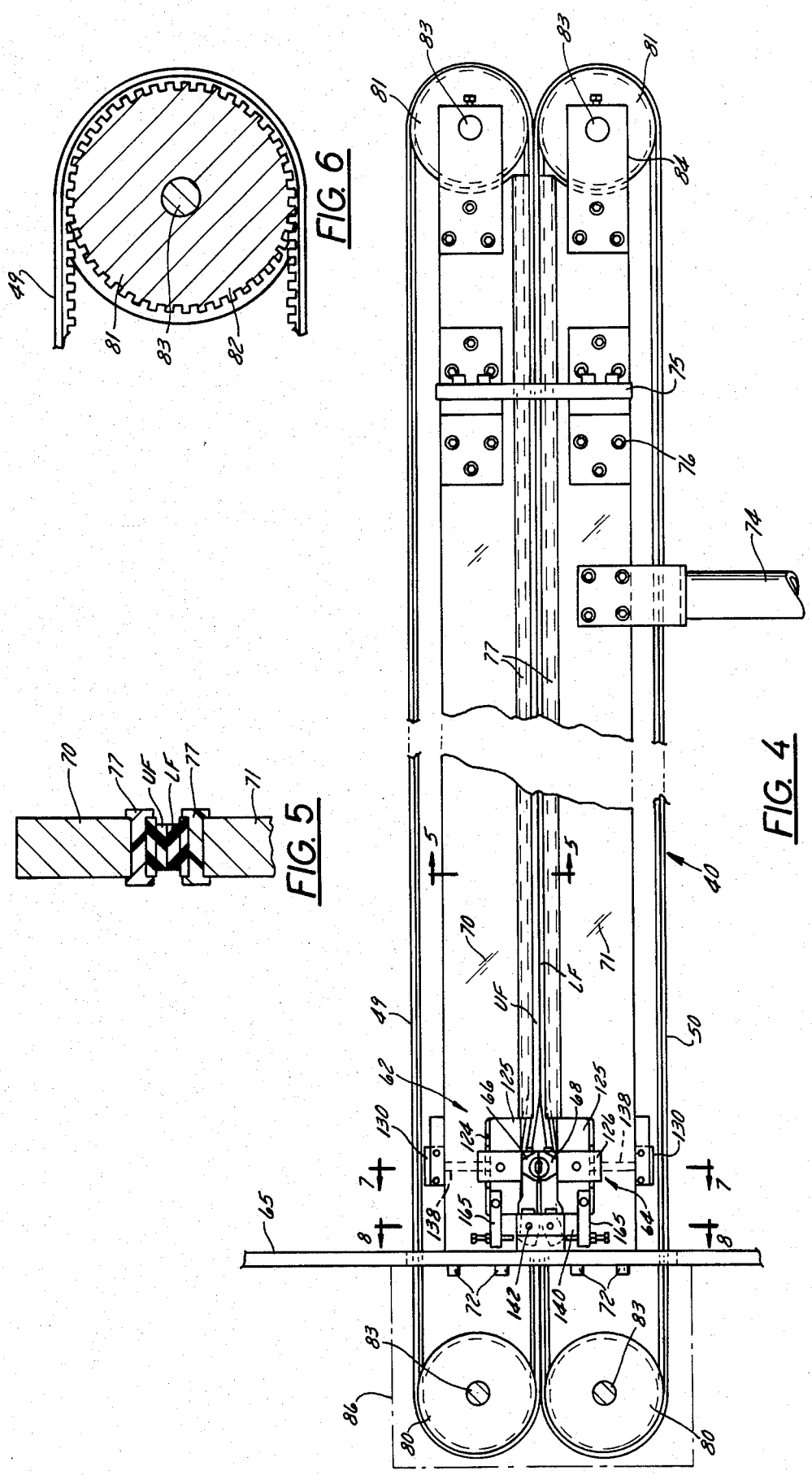

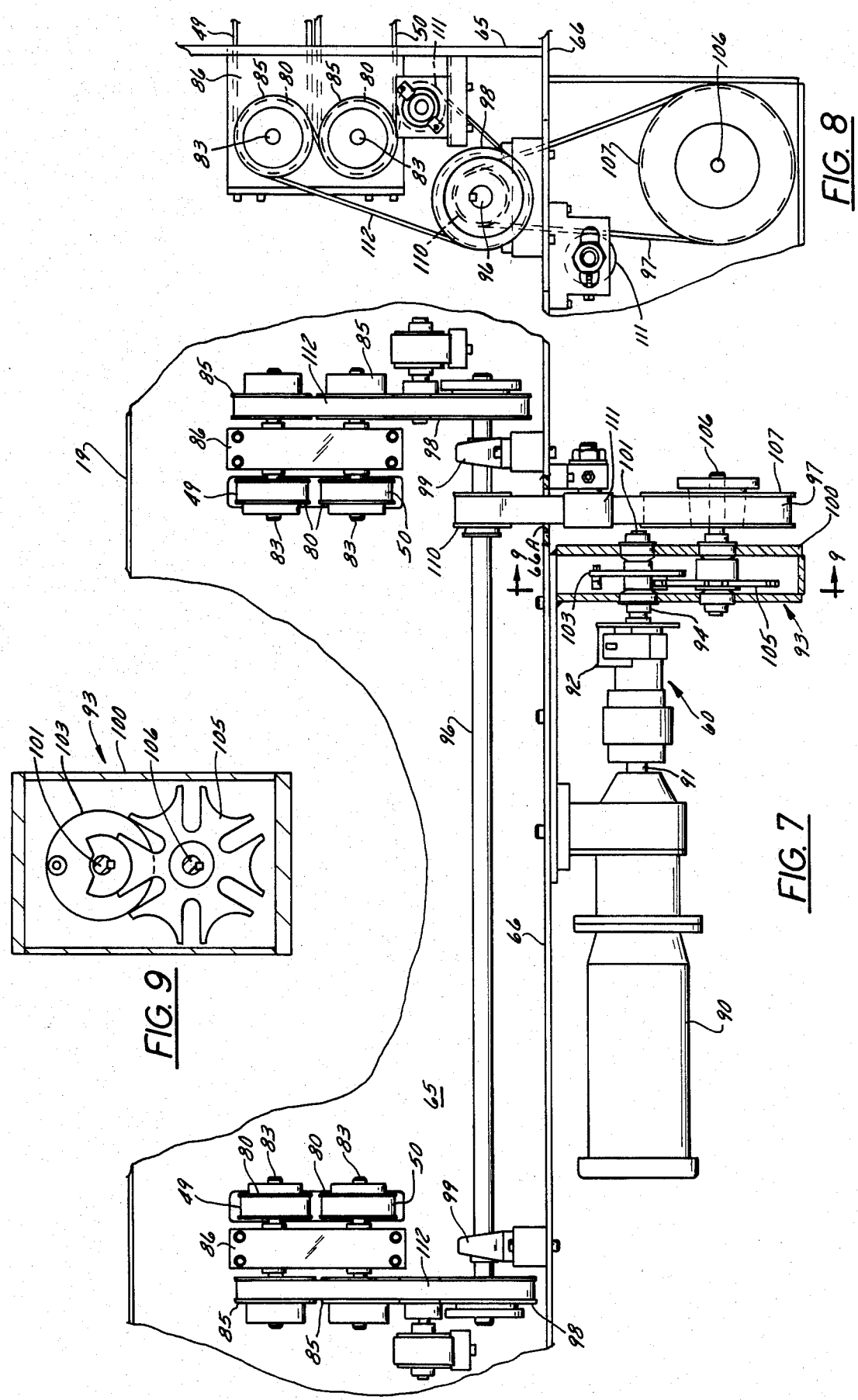

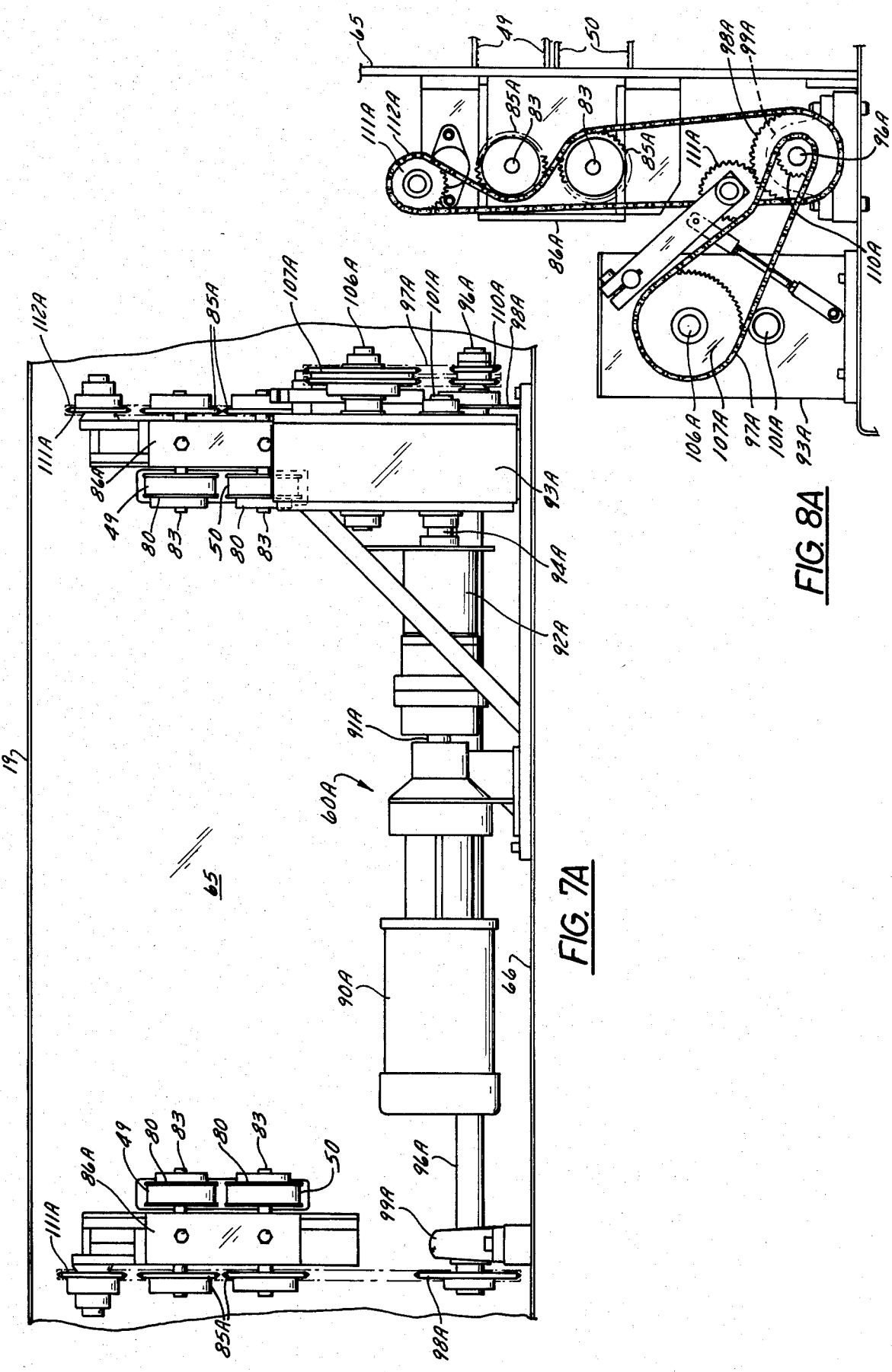

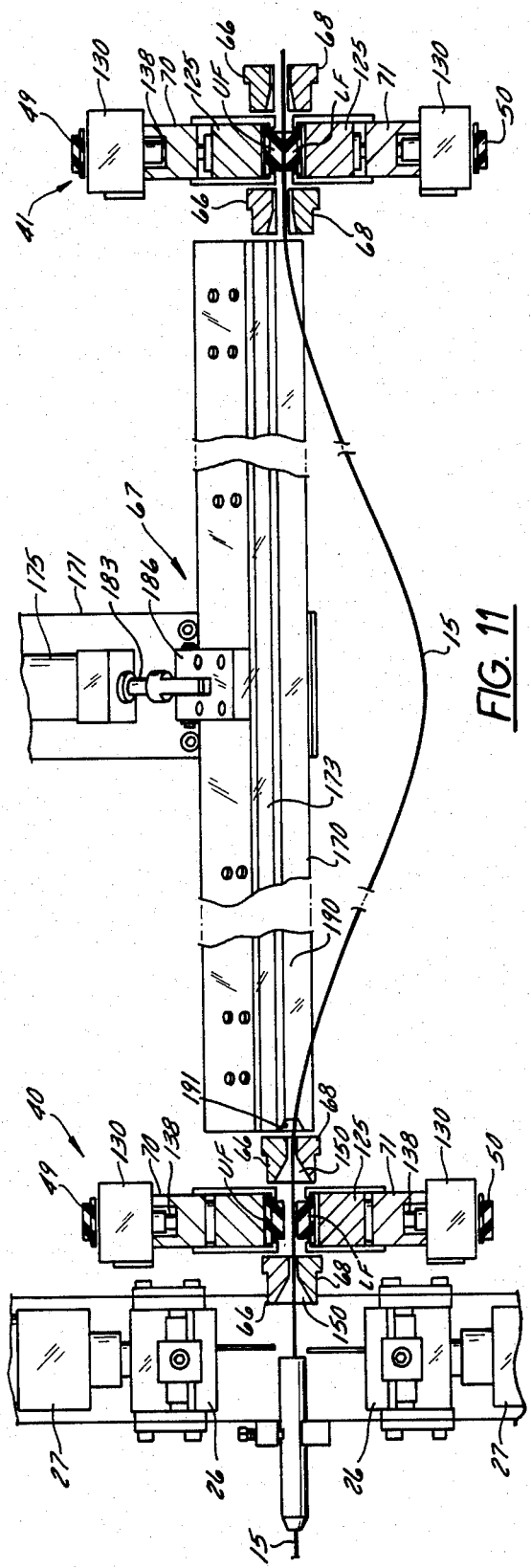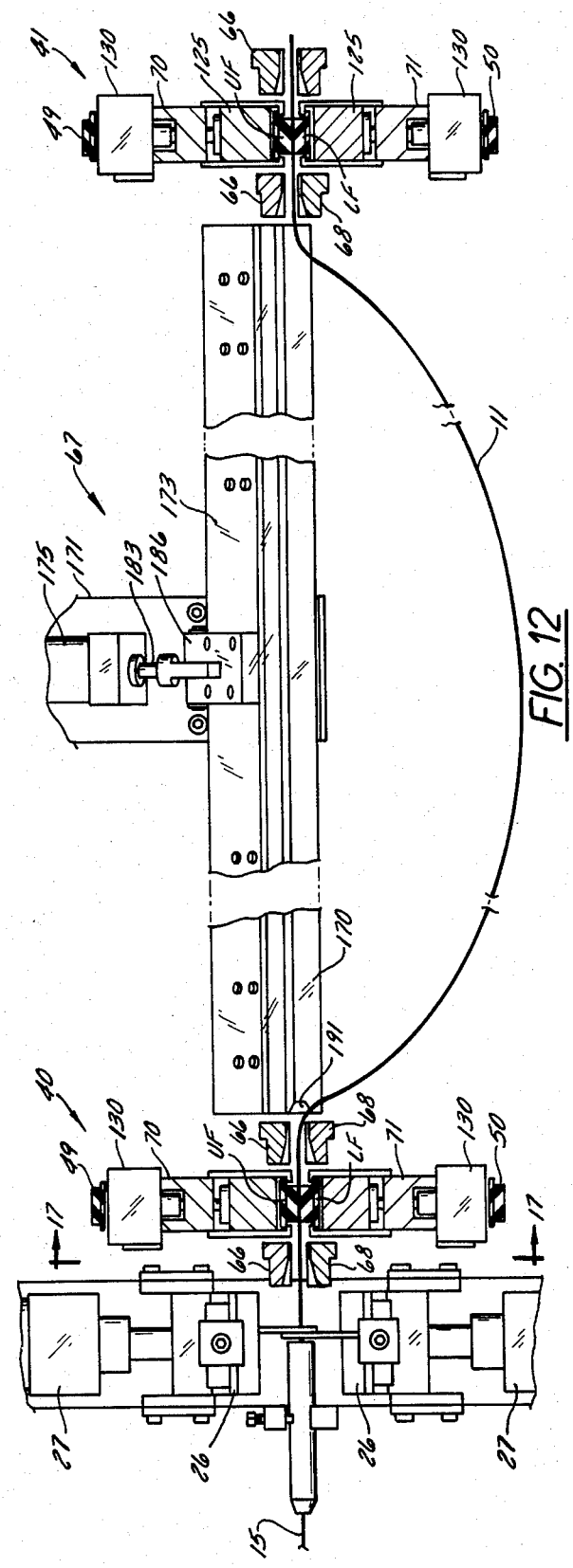

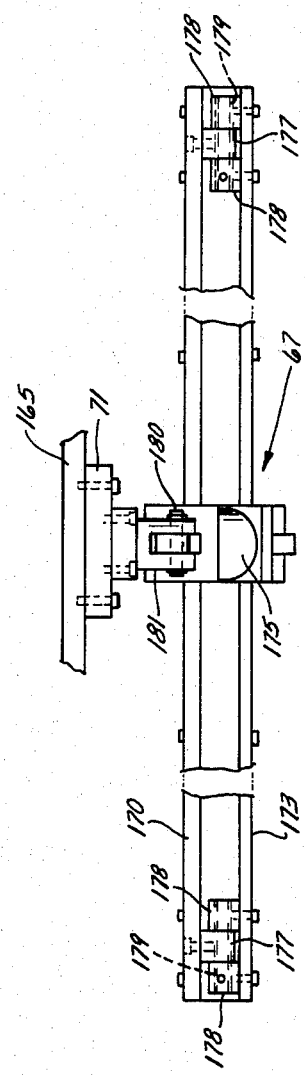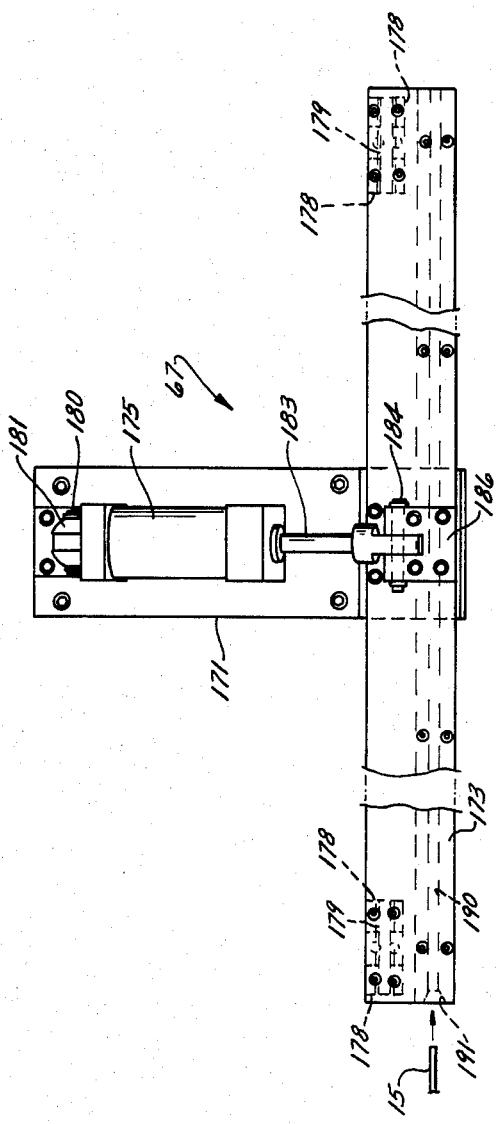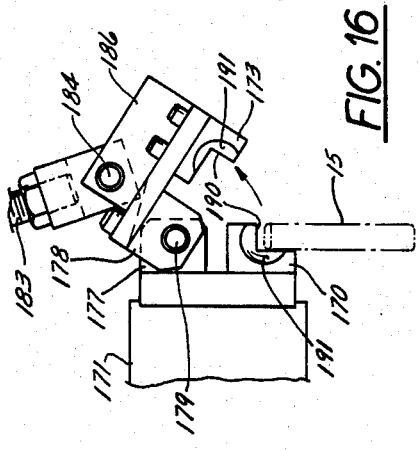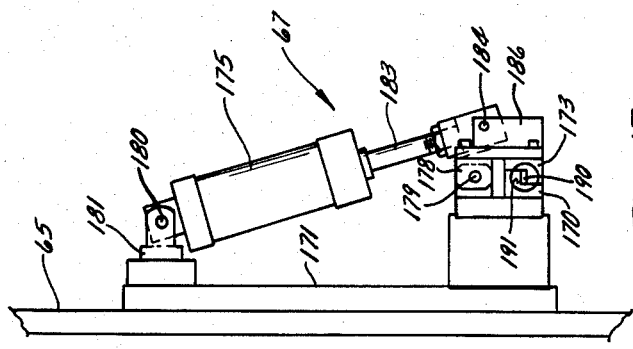

APPARATUS FOR CUTTING AND CONVEYING SEGMENTS OF WIRE OR CABLE

BACKGROUND OF THE INVENTION

1. Field of Use

This invention relates generally to apparatus for cutting segments from a strand of wire or cable and for conveying the segments to work stations so that either or both ends of the segments can be processed to provide partly or fully finished wire leads or cords.

In particular, it relates to improved conveyor means for such apparatus, such conveyor means comprising a pair of flexible endless belt type conveyor units and means to facilitate insertion of the strand thereinto.

2. Description of the Prior Art

U.S. Pat. No. 4,175,316 entitled "Wire Lead Clamping Mechanism for Wire Lead Production Apparatus" issued Nov. 27, 1979, to R. Gudmestad and assigned to the same assignee as the present application disclosed an example of apparatus for accurate high speed cutting, conveying and attaching terminals to opposite ends of relatively long wire segments cut from a continuous strand of wire. That apparatus comprises: a feed mechanism including counter-reciprocating wire feed clamps for simultaneously drawing a plurality of separate strands of insulated wire from a plurality of wire reels; a mechanism for simultaneously straightening and arranging the strands drawn therethrough in parallel spaced apart relationship in a common generally horizontal plane; a severing mechanism for simultaneously severing sets of wire segments of predetermined length from the strands; conveyor clamps for releasably gripping and conveying sets of wire segments; and conveyor means for advancing the conveyor clamps and sets of wire segments therein through processing mechanisms and to a collecting station. The apparatus further includes conveyor clamp actuator mechanisms for causing the conveyor clamps to initially receive sets of wire segments from the feed clamps for conveyance and to subsequently release the finished leads for deposit at the collecting station. The conveyor means in that apparatus takes the form of two laterally spaced apart adjustably positionable endless chain type conveyors and the wire clamps are mechanical devices which are affixed to and movable with the conveyor chains. In that apparatus the counter-reciprocating wire feed clamps are moved back and forth across the infeed end of the conveyors for a predetermined distance to provide a wire segment of desired length and this segment is then gripped near its opposite ends by the conveyor clamps. Since that apparatus employs many relatively large and heavy movable components, some of which need to travel relatively long distances, the operational speed is somewhat limited. Furthermore, that apparatus, though extremely accurate, is expensive to manufacture because it employs very many precisely made component parts. Also, it requires a considerable amount of time to reset the apparatus to provide a run of wire segments of a different length than a previous run.

The following four prior art U.S. Pat. Nos. 4,077,118; 3,996,826; 3,961,703; 3,910,321 each disclose another type of wire lead manufacturing apparatus wherein a pair of laterally spaced apart chain and clamp type conveyors are employed, but wherein the feed mechanism comprises driven rollers and associated mechanisms to provide and present wire segments of desired length to the conveyors for conveyance and further processing. These last-mentioned four patents also disclose wire guide means to accurately direct a strand of wire into the conveyor clamps prior to severance of a segment of desired length from the strand. The aforementioned U.S. Pat. Nos. 4,077,118 and 3,996,826 disclose a central channel member between the pair of chain type conveyors which serves to accurately guide the end of the wire strand from the first conveyor, through the open clamp of the second or outboard conveyor, and into an outboard channel member where it hits an abutment which prevents further wire travel. If the central channel member is then opened and the feed mechanism allowed to operate, a loop of wire of desired length forms between the pair of conveyors and, when cut, provides a wire segment of desired length for conveyance. The chain type conveyors employed in the four aforementioned prior art U.S. patents raise similar issues of complexity and cost as were discussed in regard to U.S. Pat. No. 4,175,316. U.S. patent application Ser. No. 363,968 entitled "Belt Type Conveyor for Conveying Wire Segments" to Robert O. Dusel and Gerald E. Blaha and assigned to the same assignee as the present application discloses an improved belt type conveyor for conveying segments of wire or multi-conductor cable cut from a continuous strand by a cutting machine to other processing machines, such as insulation strippers, terminal or connector attachment machines or the like. This belt type conveyor is simple to manufacture and less costly and complex than that disclosed in U.S. Pat. No. 4,175,316. The conveyor of Ser. No. 363,968 comprises a pair of endless flexible belts supported one above the other by sprockets and guide rails so that the upper flight in the lower belt closely confronts the lower flight in the upper belt whereby cable segments entrapped between the flights are movable along the path of travel of the confronting flights. Each cable segment is disposed so that its axis is perpendicular to the path of travel of the flights and the ends of the segment extend beyond the sides of the flights so as to be accessible to the processing machines. A drive mechanism drives the confronting flights in steps or increments in the same direction and at the same speed. The belts and guide rails are constructed so that the confronting flights are biased toward each other to ensure a firm grip on the cable segments. A mechanism, including pivoted portion of the guide rails, is provided to periodically separate the infeed ends of the confronting flights to enable insertion of a cable segment therebetween. Wire guides, each comprising a pair of separable members, are disposed adjacent the confronting flights on opposite sides thereof at a location where the flights separate. The separable members have a closed position when the flights separate wherein they define a hole for receiving and directing a cable segment between the separated flights. The separable members also have an open position when the flights reclose to enable a cable segment to be moved from between the members.

The aforementioned improved belt type conveyor of Ser. No. 363,968 is especially well-adapted to convey relatively stiff cable or wire segments of relatively short length, such as those which are anywhere from 2 to 10 inches long, for example. However, if long flexible cable or wire segments are to be conveyed by such a conveyor, only one end at a time of the segment can be processed.

SUMMARY OF THE INVENTION

In accordance with the invention there is provided improved apparatus for repeatedly cutting segments from the free end of a continuous strand of wire or cable and for conveying the segments to work stations so that either or both ends can be processed to provide a partially or fully finished wire lead or cord. The apparatus comprises feed means operable to impel said free end of said strand in incremental steps along a first path; a cutting means; and conveyor means including a pair of laterally spaced apart (inboard and outboard) belt type conveyor units disposed transversely to the first path for periodically engaging the strand at spaced apart locations therealong and operable for conveying the segments cut therefrom in incremental steps along a second path transverse to the first path while maintaining the longitudinal axis of the segment transverse to the second path. Each conveyor unit comprises a pair of driven endless flexible soft-faced belts having confronting flights, each belt being rotatably supported on sprockets at opposite ends of a guide rail. Each conveyor unit comprises belt separator means operable to periodically separate the confronting flights in the associated conveyor unit at a location aligned with said first path to enable reception of the strand therebetween and reclosable thereafter to engage said strand. Each conveyor unit further comprises first wire guide means located adjacent each conveyor unit and aligned with the first path to guide the free end of the strand between the separated flights in the associated conveyor unit. The first wire guide means comprises a set of periodically closable and reopenable wire guide members on each side of a conveyor unit and operable by the associated separator means. Elongated wire guide means are located between the pair of conveyor units in alignment with the first path to guide the free end of the strand from one conveyor unit through the first wire guide means for the other conveyor unit. Each wire guide means comprises relatively movable members operably movable between a closed position wherein they define a wire-receiving aperture and an open position wherein a segment is laterally removable from the aperture when the segment is moved along the second path by the conveyor units. The aforementioned cutting means are located between the feed means and the set of wire guide members on the outside of the said one conveyor unit and are operable to sever a segment from the strand. Drive mechanisms and a programmable controller are provided for effecting synchronized operation of the wire feed means, operation of the belt separator means in each of the conveyor units, operation of the relatively movable members in each of the wire guide means, operation of the cutting means, and operation of the conveyor units.

During one cycle of operation the controller and drive mechanisms effect operation of the belt separator means in each conveyor unit to effect separation of the confronting flights of both conveyor units, and operation of the movable members in each wire guide means to effect movement thereof to closed position. Then, a first operation of the feed means is carried out to impel the strand along the first path until the free end thereof moves through the wire-receiving apertures in the wire guide means and between the separated flights of both conveyor units and reaches a predetermined position, whereupon the feed means stops. Then, the belt separator means in the other (outboard) conveyor unit operates to effect reclosure of the confronting flights of the other conveyor unit to grip the strand and to effect operation of the movable members in the first wire guide means for the other conveyor unit to effect movement thereof to open position. Then, operation of the movable members in the elongated wire guide means is carried to effect movement thereof to open position so that the strand can descend in a loop therefrom. A second operation of the feed means is then initiated to impel the strand through the one (inboard) conveyor unit to form a loop of predetermined size between the conveyor units. Then, the belt separator means in the one (inboard) conveyor unit operates to effect reclosure of the confronting flights of the one conveyor unit, and to effect operation of the movable members in the first wire guide means of the one conveyor unit to effect movement thereof to open position to enable lateral shifting of the segment therefrom. The cutting means operates to cut a segment from the strand, and the conveyor units operate to move the segment along the second path to work stations at which processing machines are located.

As is apparent, the belt separator means of a conveyor unit is connected to operate the relatively movable members of the first wire guide means associated with the same conveyor unit so that, when the confronting flights are separated, the said movable members are in closed position, and when the confronting flights are closed, the last-recited movable members are in open position.

As previously mentioned, each conveyor unit comprises a pair of vertically spaced apart elongated guide rails and each guide rail has one of the endless flexible belts arranged for rotation therearound, as by sprockets at the ends of the guide rails. The belt separator means for each conveyor unit comprises a pair of backing blocks, each backing block being slidably mounted vertically relative to an associated guide rail and slidably and grippingly engaged with the confronting flight of the associated belt. Actuator means are provided to move the backing blocks vertically away from and toward each other to thereby effect separating and reclosure movement, respectively, of the confronting flights and to effect closing and opening movement, respectively, of the movable members of the associated first guide means. A separate actuator device is provided for effecting movement of the relatively movable members of the elongated wire guide means.

Apparatus in accordance with the invention offers several advantages over the prior art. For example, it is capable of very high speed, accurate operation because it employs servo-motor driven feed rollers (instead of reciprocating heads) to impel the free end of the strand directly into the conveyor and employs a pair of spaced apart improved separable belt type conveyor units (instead of slower-operating chain type conveyors and clamps). High accuracy in measuring, cut-off and conveyance of the segments is assured because of the use of a programmable controller, of a highly precise Geneva drive to operate the conveyor units in synchronism with each other, and of the aforesaid servo-motor driven feed rollers. The apparatus is able to produce relatively long segments because the lateral spacing between the pair of conveyor units can be widely spaced initially and, further, because provision is made to feed extra wire in a loop between the conveyor units. Adjustment of apparatus in accordance with the invention to provide small or large batches of segments of a length different than in a previous batch is easily carried out in a few moments merely by pressing push-buttons to change the setting of the programmable controller rather than by laboriously changing the position of mechanical components as in some prior art apparatus. The present apparatus employs state-of-the-art electronic control, mechanical principles, components and materials and is, therefore, simple and economical to manufacture and reliable in use.

The specific belt type conveyor units disclosed herein are an improvement over that shown in U.S. patent application Ser. No. 363,968. For example, guide rails which are pivotal at their infeed end and belt-biasing means are eliminated in the present units. Furthermore, the belt drives in the present units are located at the infeed end of the conveyor units, instead of at the opposite end, thereby providing for simpler, more economical, more reliable, higher speed conveyor units. In addition the present conveyor units employ improved means for effecting separation and reclosure of the confronting belt flights and for effecting operation of the associated wire guide members. Other objects and advantages of the invention will hereinafter appear.

DRAWINGS

FIG. 4 is a side elevation view of the conveyor portion of the apparatus of FIG. 1;

FIG. 5 is an enlarged cross section view of the confronting flights of the conveyor belts taken on line 5—5 of FIG. 4;

FIG. 6 is an enlarged cross section view of a belt drive sprocket of the conveyor of FIG. 4;

FIG. 7 is a view of the drive mechanism of the apparatus shown in FIGS. 2, 3 and 4 taken on line 7—7 of FIG. 4;

FIG. 7A is a view similar to FIG. 7 but showing another embodiment of the drive mechanism;

FIG. 8 is an end view of the portion of the apparatus shown in FIG. 7;

FIG. 8A is an end view of the apparatus shown in FIG. 7A;

FIG. 9 is a view of a geneva drive mechanism taken on line 9—9 of FIG. 7;

FIGS. 11 and 12 are views similar to FIG. 10 but showing the components in different operating positions;

FIG. 13 is a front elevation view of an elongated wire guide component shown in FIGS. 10, 11 and 12;

FIG. 14 is a top plan view of the elongated wire guide component of FIG. 13;

FIG. 15 is an end elevation view of the elongated wire guide component of FIG. 13;

FIG. 16 is an enlarged view similar to FIG. 15 but showing the elongated wire guide component in a different operating position;

DESCRIPTION OF A PREFERRED EMBODIMENT

Figure 1:
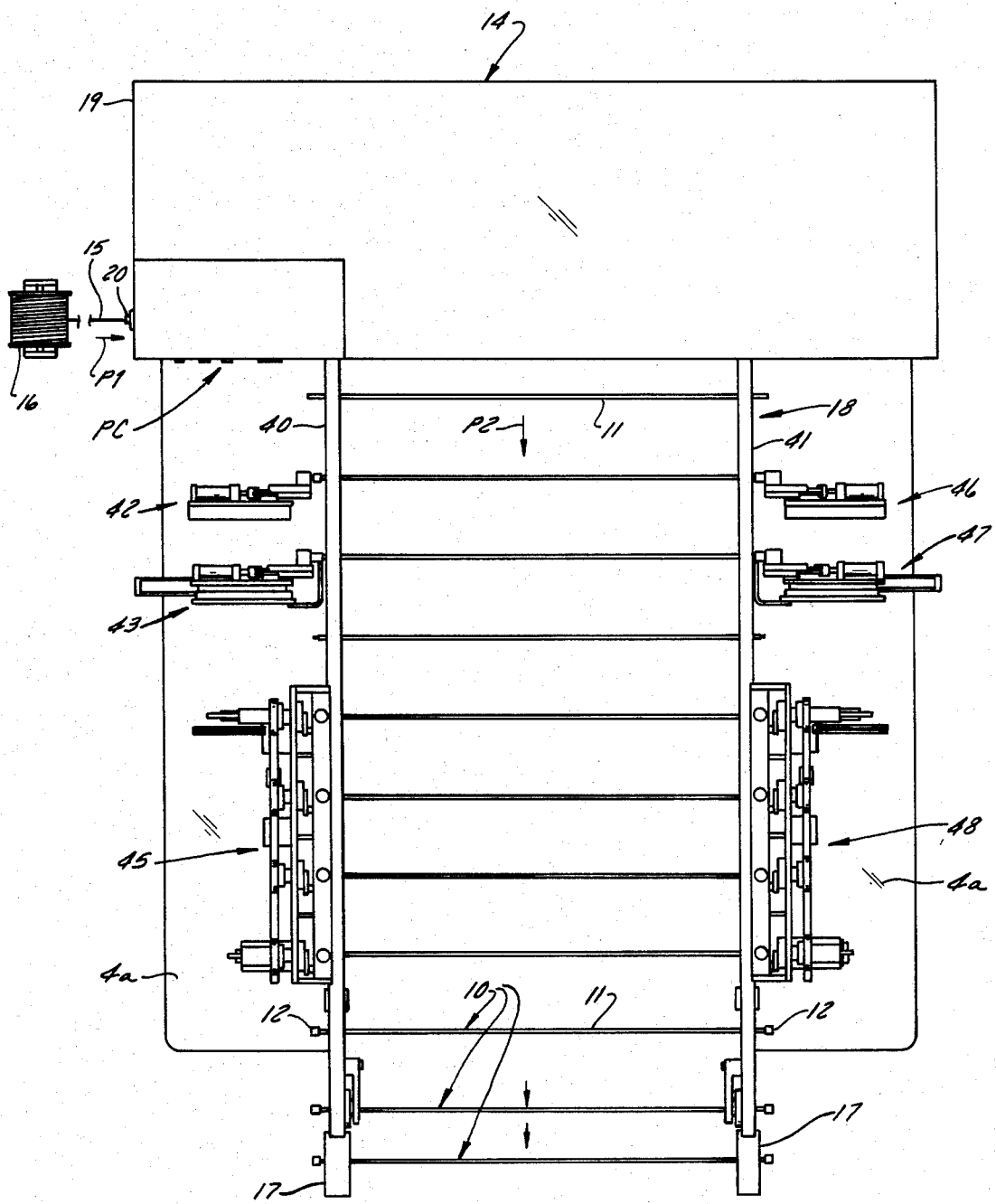
FIG. 1 is a top plan view of wire lead manufacturing apparatus including a wire cutter and conveyor and plug attachment machines in accordance with the invention.
Figure 3:
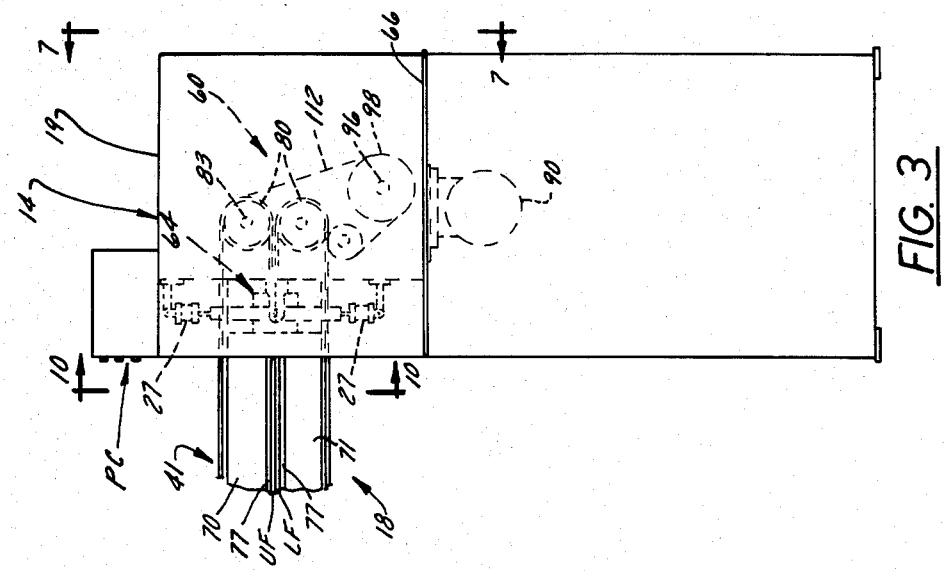
FIG. 3 is a side elevation view of the portion of the apparatus of FIG. 2.

FIG. 1 is a top plan view of apparatus in accordance with the invention. The apparatus comprises a machine 14 for drawing a continuous strand 15 of multiconductor cable from a reel 16, for feeding the free end of the strand along a path P1 in incremental steps into the infeed end of an associated conveyor 18 (which includes an inboard unit 40 and an outboard unit 41) and for periodically severing cable segments 11 of desired length from the strand for conveyance by the conveyor 18 in incremental steps along a path P2 to and past processing machines at work stations which are located on opposite sides of the conveyor so that either or both ends can be processed to provide partly or fully finished wire leads or cords such as cord 10.

Figure 2:
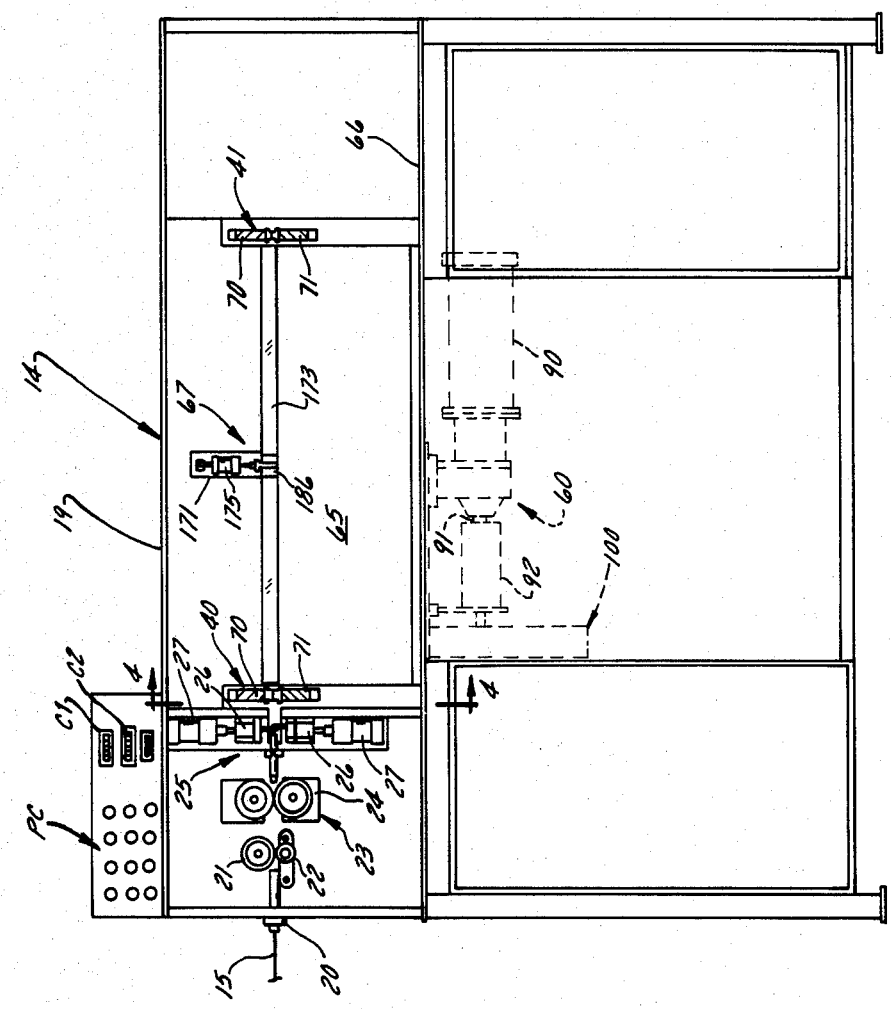
FIG. 2 is a front elevation view, partly in section, of a portion of the apparatus in FIG. 1.
Figure 10:
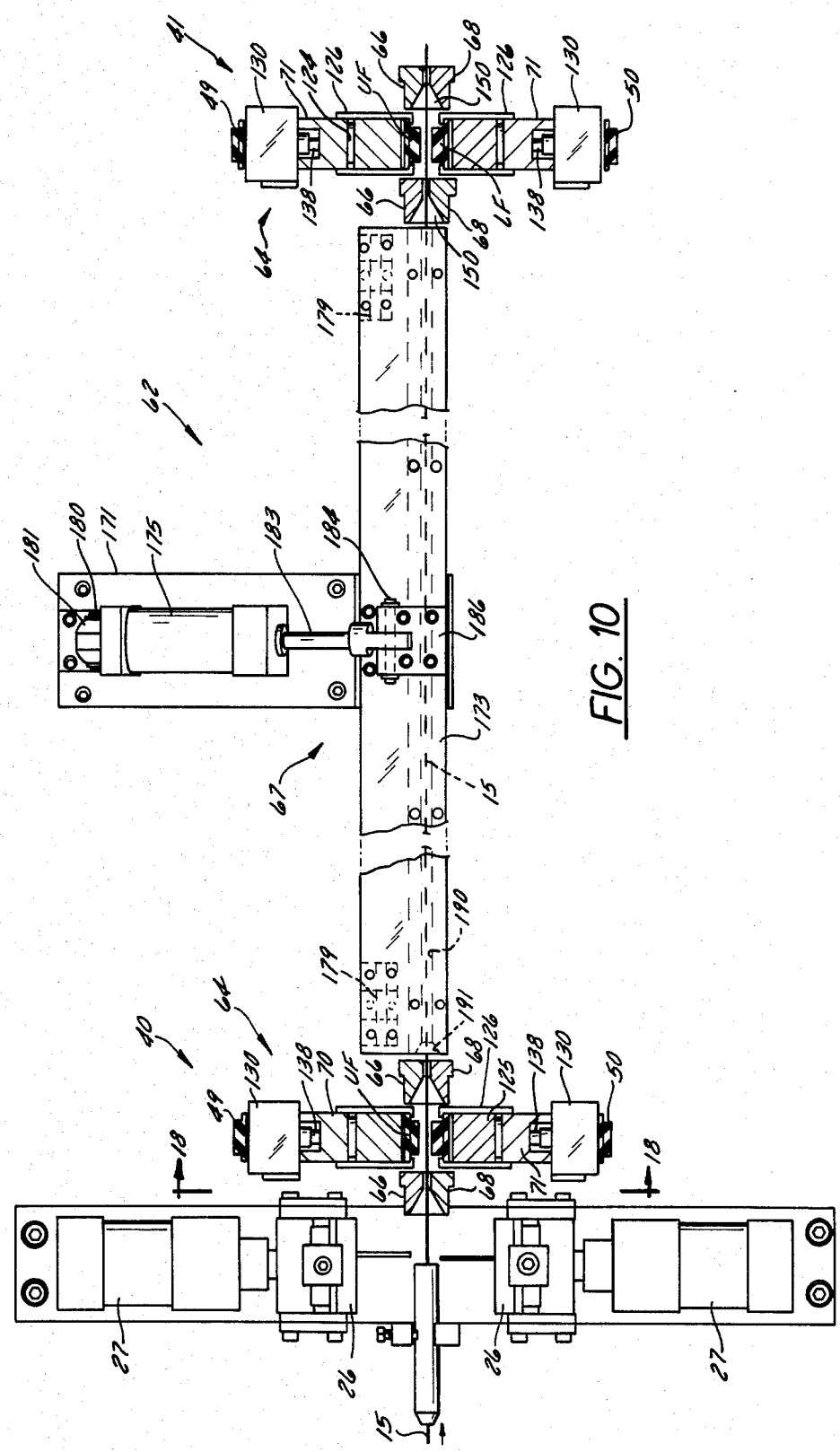
FIG. 10 is an enlarged front elevation view, partly in section, of wire-receiving components shown in FIG. 2.

Machine 14 and its associated conveyor 18 may, for example, take the form of a Model CS-30-AT machine available from Artos Engineering Company, 15600 West Lincoln Avenue, New Berlin, Wis. 53151, U.S.A., and described in that company's Bulletin No. A-72. As FIG. 2 shows, machine 14 comprises a supporting cabinet 19; a wire straightener 20; a measuring and encoder wheel 21 and its associated positionable pressure wheel 22; a drive assembly 23 comprising a pair of feed wheels and a pneumatic cylinder 24 for feed wheel separation; a cutter head assembly 25 comprising cutter heads 26 and pneumatic operating cylinders 27 therefor; and a push-button type programmable controller PC. The feed wheels 22 are understood to be driven by a servo-type electric motor (not shown) and, initially upon machine set-up and threading, are opened and closed pneumatically. engagement with a contact (not shown) in a connector 12 will be assured. The wire processing machines 45 and 48 are connector attachment machines for mechanically and electrically connecting the connectors 12 to the ends of each segment 11.

It is to be understood that the two connector attachment machines 45 and 48, one adjacent the outboard sides of each conveyor unit 40 and 41, operate in unison to attach a connector 12 to an end of a segment 11 extending from the conveyor unit. Each machine 45 and 48 operates to mechancially and electrically connect a connector 12 to an end of the cable segment 11 and both machines 45 and 48 cooperate during performance of a continuity test on a finished cord 10.

As FIG. 2 through 9 show, the conveyor 18 comprises a conveyor drive means or mechanism 60 for driving the conveyor units 40 and 41 in synchronism, and a mechanism 62, shown in FIGS. 4 and 10 through 20, to enable insertion of the strand 15 into the conveyor 18. FIGS. 7A and 8A show another embodiment of conveyor drive means or mechanism designated 60A and hereinafter described in detail. Since the conveyor units 40 and 41 are substantially similar in construction and mode of operation except as hereinafter explained, only conveyor unit 40 is hereinafter described in detail. As FIG. 4 shows, each conveyor unit 40 comprises a pair of endless flexible driven upper and lower belts 49 and 50, respectively, having confronting flights UF and LF separable to receive the strand 15 therebetween and reclosable to grip a segment near one end for conveyance. The mechanism 62 for strand insertion comprises a separator device 64 in each conveyor unit 40, 41 to periodically 19 between the conveyor units 40 and 41 and is operable by a pneumatic motor 175. The aforementioned programmable controller PC operates the wire cutting machine 14, the conveyor units 40, 41 and all associated components and drive mechanisms in appropriate synchronism and sequences so as to cut and convey wire segments 11 of predetermined length.

In operation, the strand 15 is cut into segments 11 which are conveyed by conveyor 18 along path P2, which is perpendicular (transverse) in a horizontal plane to path P1, with the longitudinal axis of each segment 11 being disposed perpendicularly (transversely) in a horizontal plane to path P2. The segments 11 are conveyed in spaced apart relationship to one another and in incremental steps along path P2. The ends of each segment 11 project beyond the outboard sides of the conveyor units 40 and 41 so as to be accessible to the wire processing machines 42, 43, 45 and 46, 47, 48 (which are not part of the present invention) shown in FIG. 1, which are mounted on tables 4a adjacent the conveyor units 40, 41.

The wire processing machines 42 and 46 are, for example, known types of strippers which strip end portions of the insulation sheath (not shown) from each segment 11 so that an exact length of exposed conductors (not shown) extend from sheath on the outboard sides of the conveyor units 40 and 41. The wire processing machines 43 and 47 are, for example, known types of trimming machines for trimming the exposed ends (not shown) of the insulated conductors (not shown) of the segments 11 to ensure that each electrical conductor (not shown) extends substantially to the end of the insulation therearound and Machine 14 and its associated conveyor 18 is capable of processing single conductor wires or cables and multiconductor cables, whether round or flat, up to 2.0 mm$^2$ in diameter; of cutting segments from strands of wire or cable ranging in length from 420 mm to 100 meters; of stripping pieces of insulation therefrom ranging in length from 3.0 to 100 mm; and of operating at a maximum infeed rate of 4.5 meters per second. Programmable controller PC is understood to contain two counters, i.e., a length counter C1 which totalizes the present length of wire and a piece counter C2 which totalizes the number of wire sections cut. Controller PC also includes two memories (not shown) which hold or store the predetermined length and the number of pieces to be made.

The conveyor 18, hereinafter described in detail, generally comprises a pair of laterally spaced apart synchronized belt type conveyor units 40 and 41 which are connected to cabinet 19 and driven in synchronism by a drive mechanism 60 in the cabinet 19. As FIG. 3 makes clear, each conveyor unit 40 and 41 comprises a pair of endless flexible driven upper and lower belts 49 and 50, respectively, having soft-faced confronting flights UF and LF which are periodically separable to receive the strand 15 therebetween and reclosable to grip a segment 11 near one end for conveyance. Means are provided to enable insertion of strand 15 into conveyor 18. A separator device 64 is provided in each conveyor unit 40, 41 to periodically separate sets of separable wire guides 66 and 68 which are located on opposite sides of each conveyor unit 40, 41. An elongated intermediate wire guide 67 is located on the front of cabinet separate the confronting belt flights UF and LF, a set of separable wire guides 66 and 68 on opposite sides of each conveyor unit 40, 41 connected to be operated by the associated separator device 64, and an elongated wire guide 67 between the units 40 and 41. The aforementioned programmable controller PC operates the machine 14 and the conveyor units 40, 41 in appropriate synchronism and sequences so as to cut and convey segments 11 of predetermined length.

As FIGS. 2, 3, 4, 7 and 8 show, the supporting cabinet 19 includes a rigid framework or support structure, including a vertically disposed front wall 65 and a horizontally disposed shelf 66 beneath the wall 65.

The pair of laterally spaced apart belt type conveyor units 40 and 41 extend from and have their infeed ends supported by wall 65 and are arranged to engage strand 15 at spaced apart locations therealong and to convey a segment 11 cut therefrom in incremental steps along second path P2. As FIG. 4 shows, conveyor unit 40 comprises an upper guide rail 70 and a lower guide rail 71, both guide rails being rigidly secured at the infeed end to wall 65 by bolts 72 and to a support leg 74 at the other end by brackets 75 and bolts 76. Each guide rail 70, 71 has a driven sprocket 80 rotatably mounted at its infeed end and an idler sprocket 81 rotatably mounted at its other end. The sprockets 80 and 81 are similar in construction. FIG. 6 shows that sprocket 81 comprises belt-engaging teeth 82 and is rigidly secured to a shaft 83. Each driven sprocket 80 has a sprocket drive pulley 85 connected to its shaft 83. Each shaft 83 is journalled for rotation on a bearing assembly 86 mounted on the rear side of wall 65, as FIGS. 7 and 8 show. Each idler sprocket 81 has its shaft 83 journalled for rotation on brackets 84 connected to the associated guide rail 70, 71. Each endless flexible belt 49, 50 is reeved around a driven sprocket 80 and an idler sprocket 81 and slides along an anti-friction track 77 on each guide rail 70 and 71.

As FIGS. 7, 8 and 9 show, the conveyor drive means 60 is mounted on the underside of shelf 66 of cabinet 19 and is arranged to drive the belts 49 and 50 in each conveyor unit 40 and 41 in synchronism in incremental steps. The drive means 60 comprises an electric motor 90 mounted on the underside of wall 66 and has a motor drive shaft 91. An intermittently operatable clutch 92 is connected to motor drive shaft 91. A geneva drive mechanism 93, shown in FIGS. 7 and 9, is connected to the output shaft 94 of clutch 92. A main drive shaft 96 is driven by a belt 97 which, in turn, is driven by the geneva drive mechanism 93. The drive shaft 96 is mounted for rotation on bearings 99 which are mounted on the upper side of shelf 66 and has a pair of drive pulleys 98 thereon. The geneva drive mechanism 93, which is mounted on the underside of shelf 66, is conventional in construction and comprises a housing 100, a rotatable input shaft 101 connected to be driven by the output shaft 94 of clutch 92, a driver or cam 103 having one tooth and mounted on and rotatably driven by input shaft 101, and a geneva gear 105 engaged with cam 103 and mounted on and able to effect rotation of an output shaft 106. This arrangement gives intermittent accurate motion at output shaft 106. Shaft 106 is provided with and drives a pulley 107 which drives belt 97 which is reeved therearound and around a pulley 110 on drive shaft 96. Belt 97 extends through an opening 66A in shelf 66 and an idler pulley 111 keeps the belt taut.

As FIG. 8 shows, each drive pulley 98 on drive shaft 96 has a drive belt 112 reeved therearound and also around an idler pulley 111 and around the sprocket drive pulleys 85 which effect rotation of the sprockets 80 which drive the upper conveyor belt 49 and the lower conveyor belt 50. Drive belt 112 is arranged so that the confronting belt flights UF and LF move in the same direction.

The alternative form of drive means or mechanism 60A shown in FIGS. 7A and 8A comprises an electric motor 90A mounted on the top of shelf 66 of cabinet 19 and has a motor drive shaft 91A. An intermittently operatable clutch 92A is connected to motor drive shaft 91A. A geneva drive mechanism 93A, similar to that shown in FIGS. 7 and 9, is mounted on the top side of shelf 66 and connected to the output shaft 94A of clutch 92A. A main drive shaft 96A is driven by a chain 97A which, in turn, is driven by the geneva drive mechanism 93A. The drive shaft 96A is mounted for rotation on bearings 99A on shelf 66 and has a pair of drive sprockets 98A thereon. The geneva drive mechanism 93A comprises a rotatable input shaft 101A connected to be driven by the output shaft 94A of clutch 92A to effect rotation of geneva drive output shaft 106A. This arrangement gives intermittent accurate motion at output shaft 106A. Shaft 106A is provided with and drives a double sprocket 107A which drives the chain 97A which is reeved therearound and a double sprocket 110A on drive shaft 96A. An idler sprocket 111A is provided for chain 97A to keep it taut. As FIGS. 7A and 8A show, each drive sprocket 98A on drive shaft 96A has a drive chain 112A reeved therearound and also around an idler sprocket 111A and around the drive sprockets 85A which effect rotation of the sprockets 80 which drive the upper conveyor belt 49 and the lower conveyor belt 50. Idler sprocket 111A for chain 112A is mounted on a support structure 86A mounted on the rear of wall 65 of cabinet 19. Drive chain 112A is arranged so that the confronting belt flights UF and LF move in the same direction. The drive mechanism 60A employs chains and sprockets as described, instead of belts and pulleys as in drive mechanism 60, and offers the advantage of even more precise motion of the conveyor belts 49 and 50 in the conveyor units 40 and 41.

As previously mentioned and as FIGS. 17 through 20 show, a mechanism is provided to enable insertion of strand 15 into conveyor 18. This mechanism comprises means to periodically separate the confronting belt flights UF and LF in each of the conveyor units 40 and 41 to enable the free end of the strand 15 to be inserted therebetween prior to cutting of a segment 11 therefrom and such means takes the form of the separator means or device 64 in each conveyor unit 40, 41.

Each separator device 64 comprises a lower assembly 120 and an upper assembly 122 which are substantially identical to each other, except for being mirror images of each other and except as hereinafter explained, and therefore, only lower assembly 120 is hereinafter described in detail. Lower assembly 120 comprises a recess 124 which extends inwardly and downwardly from the upper edge of lower guide rail 71. A back-up block 125 is mounted for vertical slidable movement in recess 124. Brackets 126 are rigidly secured to the opposite lateral sides of block 125 by screws 127 and have L-shaped ends 128 which cooperate with the end face 129 of block 125 to define a slot through which lower belt flight LF passes. A pneumatic cylinder or motor 130 is mounted on the lower edge of lower guide rail 71 by brackets 132 and screws 134, 136 and has a piston rod 138 which is connected to back-up block 125 by a set screw 141. Motor 130 is operable to shift block 125 and the flight LF gripped thereby between the open position (shown in FIGS. 18, 19 and 20) and the closed position (shown in FIG. 17).

The motors 130 and back-up blocks 125 for the upper and lower confronting belt flights UF and LF in conveyor unit 40 or 41 operate in unison to separate and then reclose the belt flights to enable insertion and then entrapment of the wire strand 15. As hereinafter explained, the separator devices 64 in the conveyor units 40 and 41 operate independently in a certain sequence.

The aforementioned mechanism to enable insertion of strand 15, besides including the separator means or devices 64, also includes four sets of separable wire guides, each set being an outboard set or an inboard set disposed adjacent a lateral side of one of the conveyor units 40 and 41, each set comprising an upper wire guide 66 and a lower wire guide 68, and an elongated wire guide means 67 disposed between the conveyor units 40 and 41. The upper wire guide 66 and lower wire guide 68 in each set is connected to be operated by the upper assembly 122 and the lower assembly 120, respectively, of the separator device 64 of a conveyor unit 40 or 41. In operation, when a separator device 64 closes the belt flights UF and LF (see FIG. 17), the two associated sets of wire guides open. When a separator device 64 opens the belt flights UF and LF (see FIG. 18), the two associated sets of wire guides close.

Figure 17:
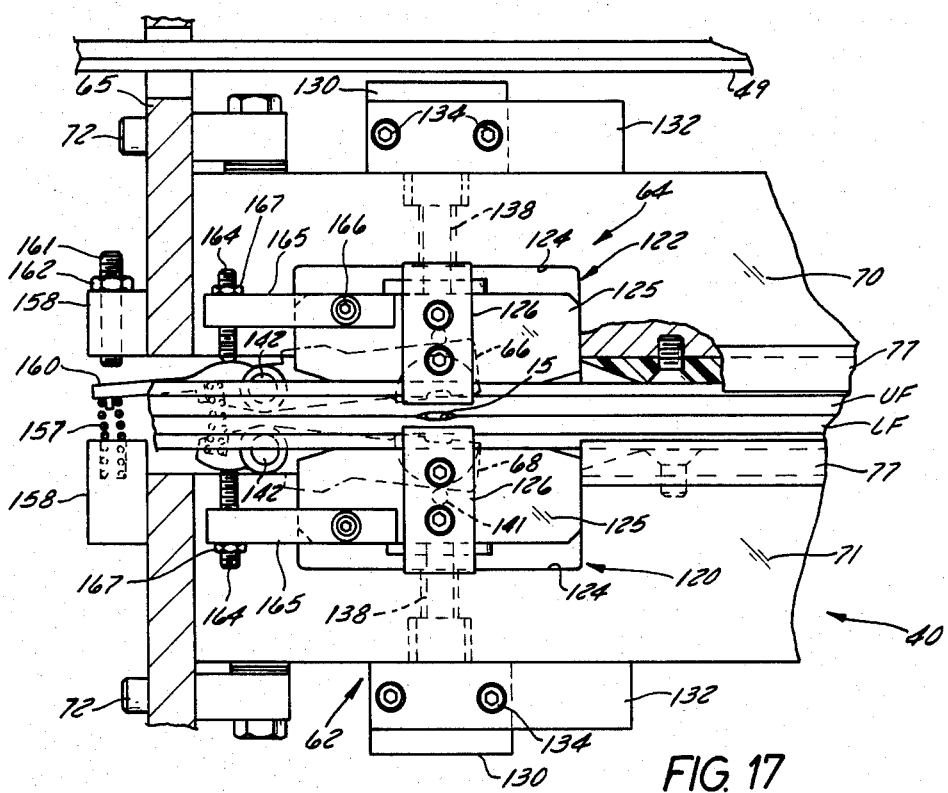
FIG. 17 is an enlarged side elevation view of the in-feed end of the conveyor or portion shown in FIG. 4 and showing it in one operation condition (closed)
Figure 18:
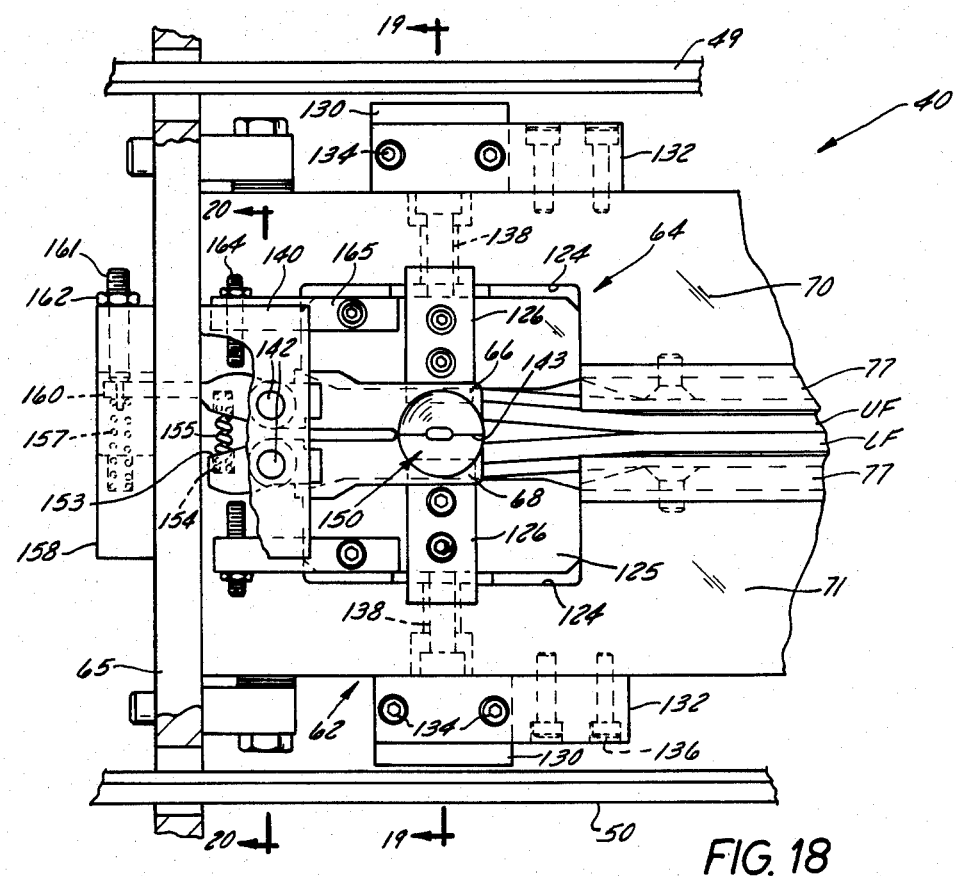
FIG. 18 is a view similar to FIG. 17 but showing the in-feed end in another operating condition (open)
Figure 20:
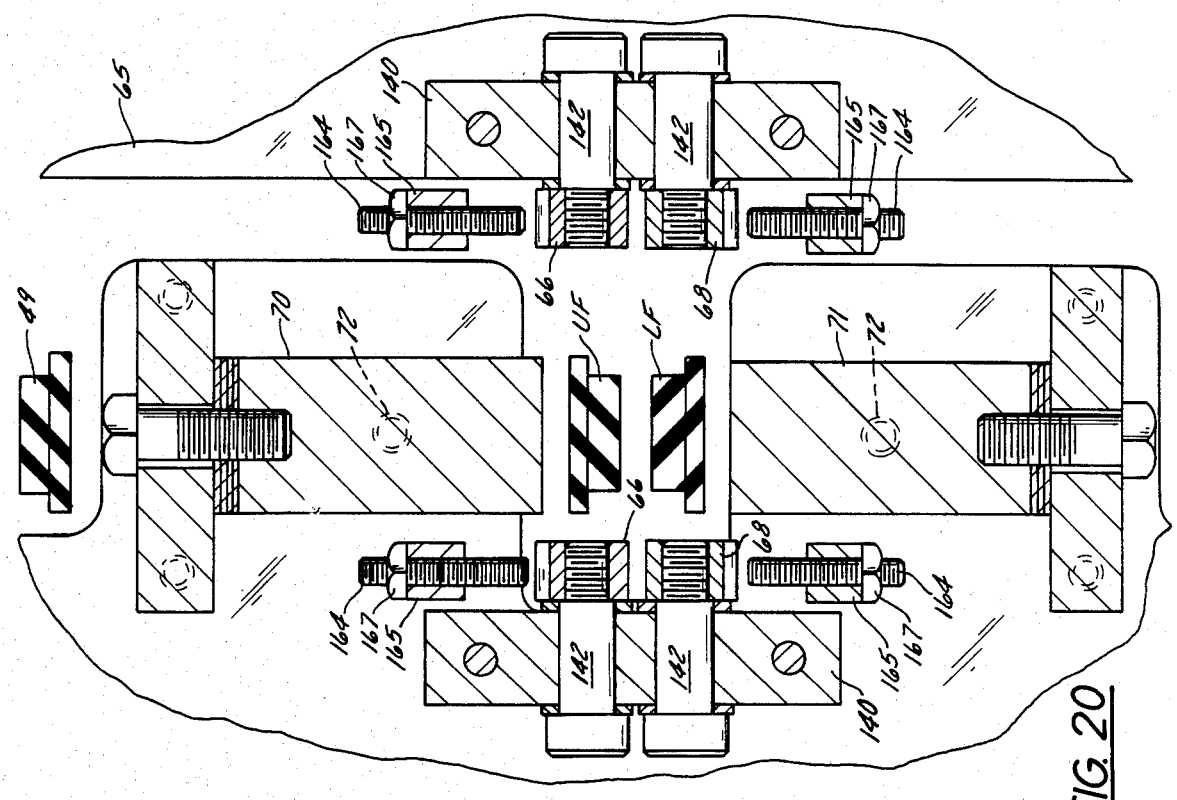
FIG. 20 is an enlarged view taken on line 20—20 of FIG. 18.
Figure 19:
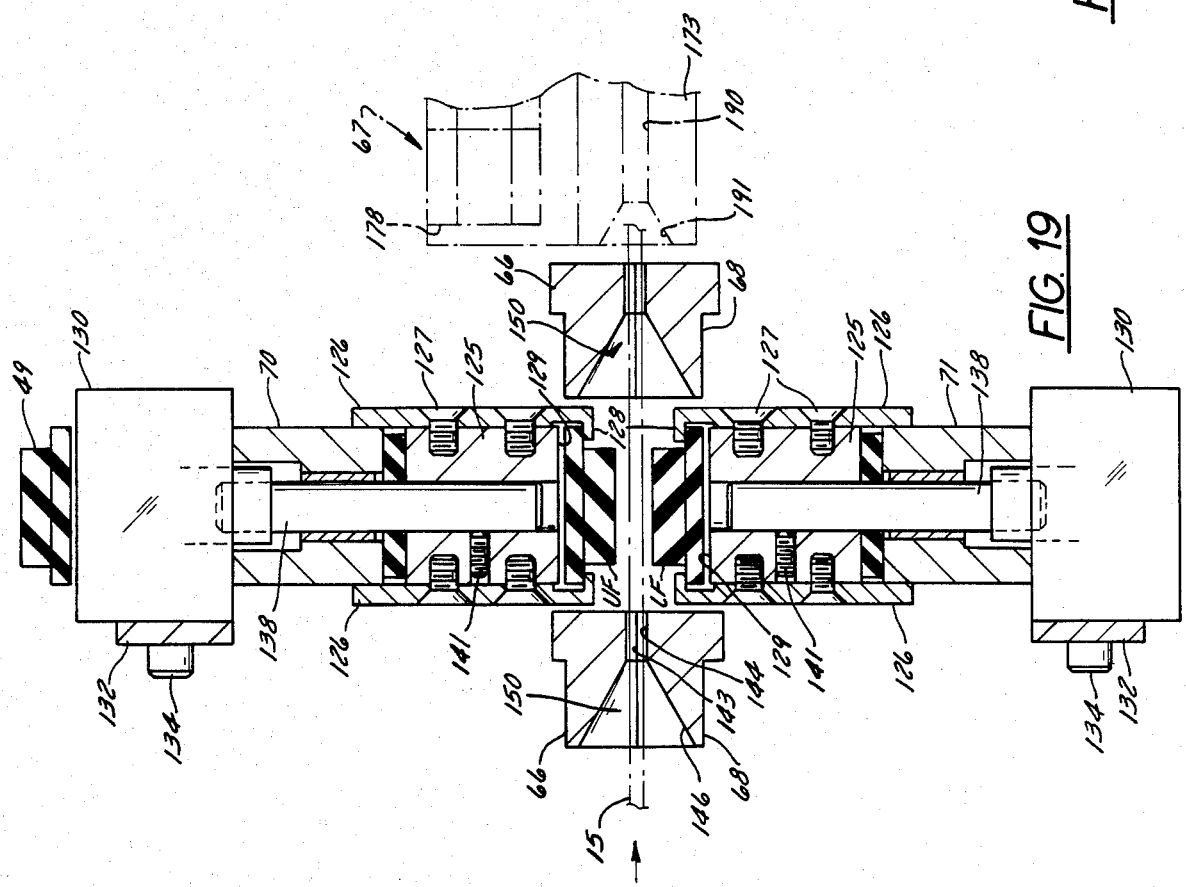
FIG. 19 is an enlarged view taken on line 19—19 of FIG. 18.

Each upper and lower wire guide 66 and 68, respectively, is pivotally mounted on a support plate 140 by means of a pivot pin or bolt 142, best seen in FIG. 20. Each support plate 140 is, in turn, rigidly mounted on the front of plate 65 of cabinet 19. The forward end of each wire guide 66, 68 comprises a flat surface 143 in which is formed a first recess 144, generally semi-cylindrical in shape, and a contiguous second recess 146, generally semi-oval in shape. When an upper wire guide 66 and its associated lower wire guide 68 are in closed position, as FIGS. 18 and 19 show, the flat surfaces 143 are in mating relationship, the first recesses 144 cooperate to define a generally oval hole and the second recesses 146 cooperate to define a generally conical hole. These two holes together define a funnel-like wire guide hole generally designated 150. The rearward end of each wire guide 66, 68 comprises a surface 153 in which is formed a spring-receiving depression 154. A helically shaped compression type main spring 155 is disposed in the confronting depressions 154 and operates to bias an upper wire guide 66 and its associated lower wire guide 68 toward closed position. As FIGS. 17 and 18 show, an auxiliary biasing spring 157 is provided to ensure complete and timely closure of the set of wire guides 66 and 68. Spring 157 has one end mounted or supported on a bracket 158 rigidly secured by bolts to the rear of plate 65. The other end of spring 157 bears against an extension arm 160 which extends rearwardly from upper wire guide 66. An adjusting screw 161 (and lock nut 162) is mounted on bracket 158 to limit upward travel of extension arm 160.

The wire guides 66 and 68 are pivoted from the closed position shown in FIG. 18 to the open position shown in FIG. 17 by vertically extending threaded actuator members 164. Each member 164 is mounted in a threaded hole in a bracket 165 which is rigidly secured to and movable with an associated back-up block 125 by means of a screw 166. Each actuator member 164 is adjustably positionable on its bracket 165 and closed in place by means of a lock nut 167.

When a set of separable wire guides 66 and 68 are closed, they define a wire guide hole 150 which accurately guides the free end of the strand 15 into and through the inboard conveyor unit 40, into the elongated wire guide 67, and into and through the outboard conveyor unit 41. However, when a set of separable wire guides 66 and 68 are open (and assuming that elongated wire guide 67 is also open), the wire guide hole 150 ceases to exist or is open on its front side and any segment 11 previously present in the guide hole 150 is able to be shifted laterally therefrom by the conveyor 18 along the path P2.

As FIGS. 10 through 16 show, the elongated wire guide means 67 comprises an elongated horizontally disposed stationary first member 170 of L-shaped cross-section rigidly secured to the front side of support wall 65 of cabinet 19 by a bracket 171, and an elongated horizontally disposed pivotally movable second member 173 of L-shaped cross-section pivotally mounted on the front side of wall 65 by hinge means and movable between an open position (FIG. 16) and a closed position (FIG. 15) by means of a pneumatic cylinder or actuator 175. The aforesaid hinge means comprise stationary hinge plates 177 above stationary member 170, hinge plates 178 on pivotable member 173, and hinge pins 179 joining the hinge plates 177 and 178. Actuator 175 has its base end pivotally connected by a pin 180 to a bracket 181 on plate 65 and has its piston rod 183 pivotally connected by a pin 184 to a bracket 186 on the front side of movable second member 173.

When member 173 is in closed position, it cooperates with member 170 to define an elongated wire-receiving passage 190 which is provided at its infeed end (left end in FIG. 13) with a conical opening 191. Passage 190 is aligned with the wire guide holes 150 of the several sets of separable wire guides comprising members 66 and 68 and is also aligned with the opening between the separated upper and lower belt flights UF and LF in end conveyor units 40 and 41.

When member 173 is in open position, passage 190 ceases to exist or is open on its bottom side and the wire strand 15 therein is able to drop downwardly to form a loop as FIGS. 11 and 12 show, provided the flights UF and LF of the outboard conveyor 41 are closed, as FIG. 11 shows, and strand 15 continues to be fed.

OPERATION

As hereinbefore mentioned, the apparatus can be programmed to operate in the following mode. Assume the following initial conditions prior to commencement of operation in such mode. The separator device 64 in each conveyor unit 40 and 41 is actuated, the confronting belt flights UF and LF are separated and the four sets of separable wire guides 66 and 68 are closed. The pneumatic actuator 175 is not actuated (i.e., is not retracted) and the elongated wire guide 67 is closed. The machine 14 is energized for operation, as is the drive mechanism 60 for the conveyor units 40 and 41. The following sequences of operation are understood to be controlled by the programmable control means in the machine 14. With the foregoing assumptions, the free end of the strand 15 is propelled by the drive assembly 23 of machine 14 along path P1 through the cutter head assembly 25, through wire guide hole 150 in the outboard wire guide set of inboard conveyor unit 40, between the separated flights UF and LF of conveyor unit 40, through wire guide hole 150 in the inboard wire guide set of inboard conveyor unit 40, through wire-receiving passage 190 of elongated wire guide means 67, through the wire guide holes 150 in the inboard wire guide set of outboard conveyor unit 41, between the separated flights UF and LF of conveyor unit 41, and through the wire guide hole 150 in the outboard wire guide set of outboard conveyor unit 41.

During operation, machine 14 operates to first feed a predetermined length of strand 15 which is substantially equal to the straight-line distance between the two conveyor units 40 and 41 plus the length of the segment end projecting from the sides of the outboard conveyor unit 41. Therefore, when the measuring and encoder wheel 21 of machine 14 determines that such predetermined length of strand 15 has been fed, operation of wire feed drive assembly 23 is stopped. Then, separator device 64 of outboard conveyor unit 41 is operated to close the separated belt flights and grip the strand. Such operation of the separator device 64 also causes the two sets of the wire guides 66 and 68 associated with outboard conveyor unit 41 to open. The actuator 175 is then operated to open the elongated wire guide 67. The wire feed drive assembly 23 is again actuated to cause resumption of wire feed and formation of a loop between the conveyor units 40 and 41, as FIGS. 11 and 12 show. When a loop of desired length is provided for, feed drive assembly 23 is stopped, separator device 64 of inboard conveyor unit 40 is actuated to close the separated belt flights UF and LF of conveyor unit 40 to thereby grip strand 15, the wire guides of conveyor unit 40 open, and the cutter head assembly 25 is actuated to sever the wire segment. Finally, the conveyor units 40 and 41 are driven in unison to advance the segment 11 laterally outward from the open wire guide sets associated with both conveyor units and along path P2 for further incremental advancement and processing at the several work stations. The foregoing steps are then repeated as often as necessary.

In the embodiment hereinbefore described, machine 14 and its associated conveyor 18 is described as processing a segment 11 which takes the form of a multi-conductor cable and to which multi-contact connectors 12 are mechanically and electrically connected at both ends. It is to be understood, however, and assuming that appropriate processing machines are provided at appropriate work stations along the conveyor 18, that a single wire, insulated or uninsulated, and round or flat multi-conductor cables, could be processed in machine 14 and its conveyor 18. Furthermore, either or both ends of a segment could be processed. Also, various types of connectors 12 and terminals (not shown) could be attached.

It is also to be noted that finished leads or cords 10 being expelled from the discharge end of conveyor 18 are collected or accumulated in accumulator devices 17 which are attached at the discharge end of each conveyor unit 40 and 41, and from which batches of finished leads or cords 10 are periodically unloaded manually.

We claim:

1. Apparatus for cutting a segment from the free end of a continuous strand of wire or cable and for conveying said segment, comprising:

feed means operable to impel said free end of said strand in incremental steps along a first path;
   a pair of laterally spaced apart belt type conveyor units disposed transversely to said first path for periodically engaging said strand at spaced apart locations therealong and operable for conveying a segment cut therefrom in incremental steps along a second path transverse to said first path while maintaining the longitudinal axis of the segment transverse to said second path, each conveyor unit comprising a pair of driven endless flexible belts having confronting flights;

belt separator means operable to periodically separate said confronting flights in each conveyor unit at a location aligned with said first path to enable reception of said strand therebetween and reclosable thereafter to engage said strand;

first wire guide means located adjacent each conveyor unit and aligned with said first path to guide said free end of said strand between the separated flights in the associated conveyor unit;

elongated wire guide means located between said pair of conveyor units and aligned with said first path to guide said free end of said strand from one conveyor unit through the first wire guide means for the other conveyor unit;

each wire guide means comprising relatively movable members operably movable between a closed position wherein they define a wire-receiving aperture and an open position wherein a segment is laterally removable from said aperture as said segment is moved along said second path;

cutting means located between said feed means and said first wire guide means of said one conveyor unit and operable to sever a segment from said strand;

and control means for effecting operation of said wire feed means, operation of said belt separator means in each of said conveyor units, operation of said relatively movable members in each of said wire guide means, operation of said cutting means, and operation of said conveyor units.

2. Apparatus according to claim 1 wherein said control means effects:

operation of the belt separator means in each conveyor unit to effect separation of the confronting flights of both conveyor units;

operation of the movable members in each wire guide means to effect movement thereof to closed position;

a first operation of said feed means to impel said strand along said first path until said free end thereof moves through said wire-receiving apertures in said wire guide means and between the separated flights of both conveyor units and reaches a predetermined position;

operation of the belt separator means in said other conveyor unit to effect reclosure of the confronting flights of said other conveyor unit;

operation of the movable members in the first wire guide means for said other conveyor unit to effect movement thereof to open position;

operation of the movable members in said elongated wire guide means to effect movement thereof to open position;

a second operation of said feed means to impel said strand through said one conveyor unit to form a loop of wire of predetermined size between said conveyor units;

operation of the belt separator means in said one conveyor unit to effect reclosure of the confronting flights of said one conveyor unit;

operation of the movable members in said first wire guide means of said one conveyor unit to effect movement thereof to open position;

operation of said cutting means to cut a segment from said strand;

and operation of said conveyor units to move said segment along said second path.

3. Apparatus according to claim 1 or 2 wherein the belt separator means of a conveyor unit is connected to operate the relatively movable members of the first wire guide means associated with the same conveyor unit so that, when the confronting flights are separated, the said movable members of the first wire guide means are in closed position, and so that, when the confronting flights are closed, the last-recited movable members are in open position.

4. Apparatus according to claim 3 wherein each conveyor unit comprises: a pair of vertically spaced apart elongated guide rails, each guide rail having one of said endless flexible belts arranged for rotation therearound; and wherein said belt separator means for each conveyor unit comprises a pair of backing blocks, each backing block being slidably mounted vertically relative to an associated guide rail and slidably and grippingly engaged with the confronting flight of the associated belt; and actuator means to move said backing blocks vertically away from and toward each other to thereby effect separating and reclosure movement, respectively, of the confronting flights and to effect closing and opening movement, respectively, of the movable members of the associated first guide means.

5. Apparatus according to claim 4 including an actuator device for effecting movement of said relatively movable members of said elongated wire guide means.

6. Apparatus according to claim 1 wherein said first wire guide means located adjacent a conveyor unit includes one set of wire guides on each side of said conveyor unit and wherein each set of wire guides comprises a pair of relatively movable wire guide members.

7. In a conveyor unit for conveying a segment of wire or cable along a path with the segment transverse to said path:

a pair of spaced apart elongated guide rails;

a pair of endless flexible belts, each belt being mounted for rotation around an associated one of said guide rails, the adjacent flights of the belts on the guide rails being confronting flights adapted to entrap and convey a segment therebetween;

and means to effect separation of said confronting flights at a location therealong to enable axial movement of a segment therebetween comprising:

a pair of backing blocks, each backing block being slidably mounted on an associated guide rail and slidably and grippingly engaged with the confronting flight of the associated belt;

and actuator means to move said backing blocks away from and toward each other to thereby effect separating and reclosure movement, respectively, of said confronting flights.

8. A conveyor unit according to claim 7 including wire guide means to direct a segment moving between the separated confronting flights and comprising:

at least one set of wire guides disposed adjacent said belts at the location whereat said confronting flights separate and comprising a pair of wire guide members movable between a closed position wherein said wire guide members define a wire guide hole aligned with the separation between said separated confronting flights, and an open position wherein said wire guide members open to enable a segment to be shifted laterally from between said wire guide members as said segment is gripped and conveyed along said path by the reclosed confronting flights.

9. A conveyor unit according to claim 8 wherein said wire guide members are connected to be movable to open position by the associated backing blocks;

and including biasing means for positively moving said wire guide members to closed position.

10. A conveyor unit according to claim 9 wherein each guide rail has a recess extending inwardly from the edge of the guide rail adjacent a confronting belt flight, and wherein each backing block is slidably mounted in the recess of its associated guide rail.

11. A conveyor unit according to claim 10 wherein each wire guide member is pivotally mounted relative to a guide rail and is engageable with a portion of its associated backing block, and wherein said biasing means is disposed between said pair of wire guide members.

12. A conveyor unit according to claim 11 wherein said actuator means for moving the backing blocks comprises a pair of actuators, one for each guide rail, each actuator being mounted on an associated guide rail and connected to its associated backing block.

13. In a conveyor for receiving a strand of wire or cable and for conveying a segment thereof along a path with the segment transverse to said path;
a pair of laterally spaced apart belt type conveyor units, one being an inboard conveyor unit and the other an outboard conveyor unit, each conveyor unit comprising:
a pair of spaced apart elongated guide rails;
a pair of endless flexible belts, each belt being mounted for rotation around an associated one of said guide rails, the adjacent flights of the belts on the guide rails being confronting flights adapted to entrap and convey a segment therebetween;
means to effect separation of said confronting flights at a location therealong to enable axial insertion of the free end of said strand therebetween comprising:
a pair of backing blocks, each backing block being slidably mounted relative to an associated guide rail and slidably engaged with the confronting flight of the associated belt;
and actuator means to move the backing blocks away from and toward each other to thereby effect separating and reclosure movement, respectively, of said confronting flights;
and wire guide means to direct said strand between the separated confronting flights comprising:
at least one set of wire guides adjacent each conveyor unit and comprising a pair of wire guide members movable between a closed position wherein said wire guide members define a wire guide hole aligned with the separation between said separated confronting flights and an open position wherein a segment is shiftable laterally from between said wire guide members;
said wire guide members being movable to open position by movement to closed position of the associated backing blocks;
biasing means for moving said wire guide members to closed position;
and elongated wire guide means to direct said strand from one conveyor unit to the other and comprising:
a pair of elongated members movable between a closed position wherein said elongated members define a wire guide passage aligned with said wire guide holes and an open position wherein a segment is shiftable from between said elongated wire guide members;
and means for moving said elongated members between open and closed position independently of the movement of said set of wire guides.

14. A wire conveyor according to claim 13 comprising a set of said wire guides on both sides of said inboard conveyor unit and a set of wire guides between said elongated wire guide means and said outboard conveyor unit.

15. A wire conveyor according to claim 13 comprising a set of wire guides on both sides of each conveyor unit.

16. A wire conveyor unit according to claim 13 or 14 wherein each guide rail has a recess extending inwardly from the edge of the guide rail adjacent a confronting belt flight, and wherein each backing block is slidably mounted in the recess of its associated guide rail.

17. A wire conveyor unit according to claim 16 wherein each wire guide member is pivotally mounted relative to a guide rail and is engageable with a portion of its associated backing block, and wherein said biasing means is disposed between said pair of wire guide members.

18. A wire conveyor unit according to claim 17 wherein said actuator means for moving the blocks comprises a pair of actuators, one for each guide rail, each actuator being mounted on an associated guide rail and connected to its associated backing block.

19. Apparatus for repeatedly cutting segments from a strand of wire or cable and for conveying them to work stations so that either or both ends can be processed to provide a partly or fully finished wire lead or cord, said apparatus comprising:
a feed mechanism for moving the free end of said strand in incremental steps along a first path;
inboard and outboard laterally spaced apart conveyor units for moving segments cut from said strand in incremental steps along a second path transverse to the first path, each unit comprising a pair of endless flexible belts having separable soft-faced confronting flights;
a separator device for each conveyor unit to periodically separate and reclose the confronting flights at a location aligned with said first path;
a set of periodically closable and reopenable wire guide members on each side of each conveyor unit and aligned with said first path and operable by the associated separator device so that when the associated confronting flights are open the wire guide members are closed and vice-versa;
an independently openable elongated wire guide located between said conveyor units in alignment with the sets of wire guide members;
a cutter located between the feed mechanism and the set of wire guide members on the outside of the inboard conveyor unit;
and drive mechanisms and a programmable controller for operating the feed mechanism, the conveyor units and their associated separator devices and wire guides, and the cutter in synchronism.

* * * * *